United States Patent [19]

Dreisin

[11] Patent Number: 4,646,386

[45] Date of Patent: Mar. 3, 1987

[54] METHOD OF AND APPARATUS FOR INTERMITTENTLY DISPENSING OF FILLED PRODUCTS

[76] Inventor: Ilya Dreisin, 353 W. 57 St. #1257, New York, N.Y. 10019

[21] Appl. No.: 724,670

[22] Filed: Apr. 18, 1985

[51] Int. Cl.⁴ .............................................. A22C 11/02
[52] U.S. Cl. ........................................... 17/49; 17/35; 17/41
[58] Field of Search ................. 17/33, 35, 41, 42, 49

[56] References Cited

U.S. PATENT DOCUMENTS

| 3,872,543 | 3/1975 | Niedecker | 17/33 |
| 4,257,146 | 3/1981 | Karp | 17/49 |
| 4,292,711 | 10/1981 | Becker | 17/41 X |
| 4,442,568 | 4/1984 | Petry | 17/33 |
| 4,512,059 | 4/1985 | Beckman | 17/41 X |

FOREIGN PATENT DOCUMENTS 3028831 3/1982 Fed. Rep. of Germany .......... 17/35

Primary Examiner—Willie G. Abercrombie

[57] ABSTRACT

Method of and apparatus for intermittently dispensing of filled products, in which is provided an automatic continuous control of expansion of the casing during the filling of the item and closing its ends by variable degree of a pressure of a fluid mass in a swelling member.

11 Claims, 8 Drawing Figures

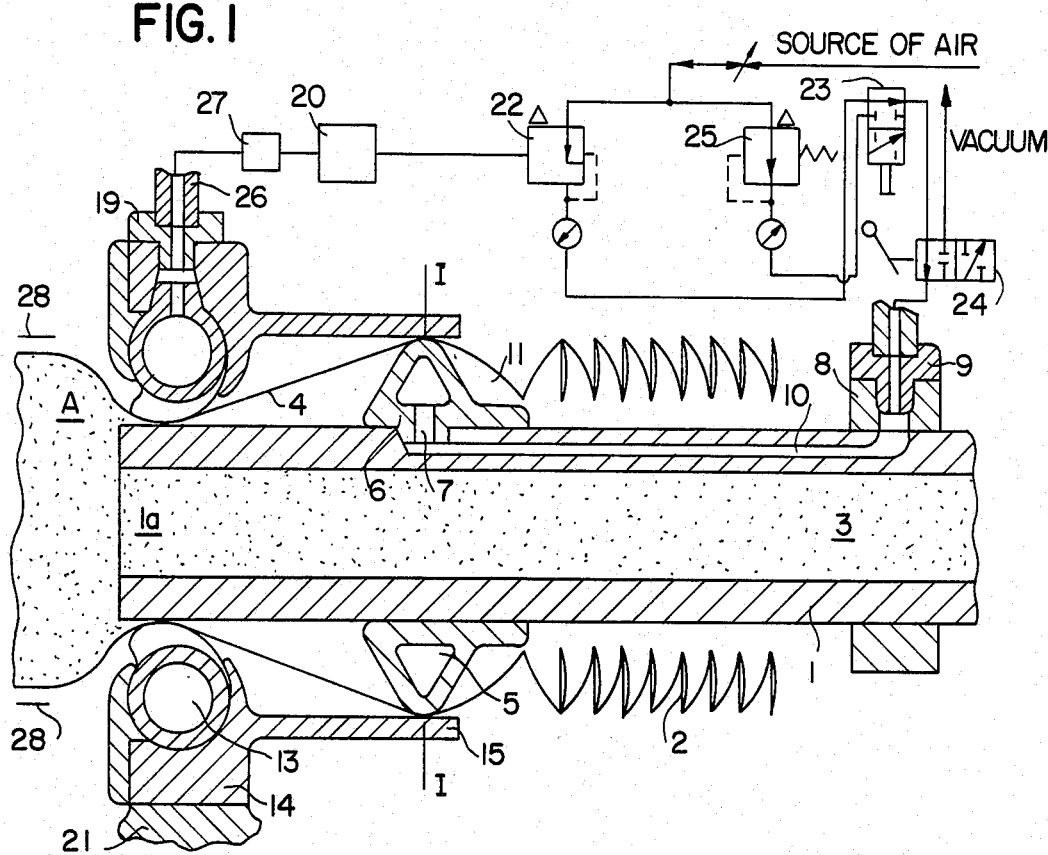
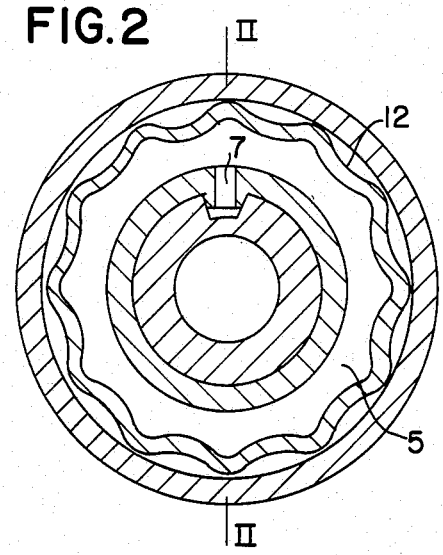

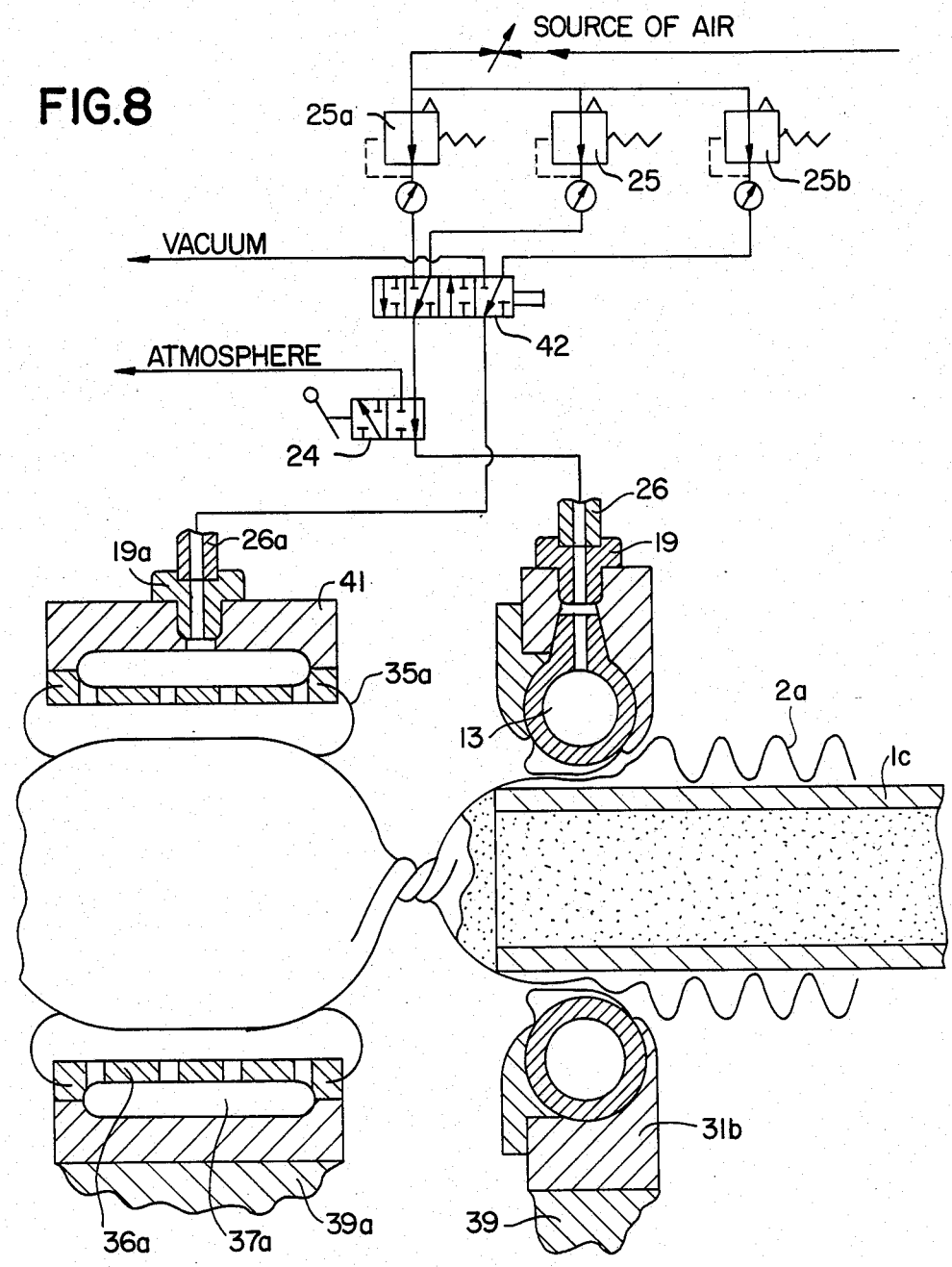

METHOD OF AND APPARATUS FOR INTERMITTENTLY DISPENSING OF FILLED PRODUCTS

BACKGROUND OF THE INVENTION

This invention relates to a method and an apparatus for intermittently stuffing a stuffing material into a casing, more particularly a method and an apparatus for stuffing the casing with a sausage stuffing material.

Conventionally, the operation of stuffing sausage meat into a casing has been carried out with equipment comprising of a stuffing device having a pump for pumping stuffing material through stuffing member, or stuffing tube, an upstream supplying device for supplying a desired portion of the casing to fill a sausage and a downstream supporting device for supporting a filled item.

Shirred casing, which are known in the trade as "sticks" or "hollow rods", are produced by gathering and longitudinally compressing long casing. In order to fill the shirred casing with a stuffing material, generally, one end of the shirred casing is first closed, and then the shirred casing is normally placed on the stuffing member. Stuffing material is then forced under pressure through the stuffing member into the casing which is continuously deshirred and supplied to a free end of the stuffing member. After a predetermined length of the casing has been filled, the filled casing is closed by twisting the casing at the free end of the stuffing member between supplying and supporting devices or is clip-closed by metallic clips or tied off by string.

For various reasons, the diameter of the sausages which are produced should remain constant throughout their entire length. Optimum filling of the tubular casing can be assured only of a uniform diameter, the size of which is dependent upon the extension of the filling casing. If the casing is overfilled, it may burst, whereas, if the casing is insufficiently filled, it will have a wrinkled surface.

Various methods and apparatuses for stuffing shirred tubular casing with sausage mixtures have been proposed in which special arrangements for deshirring, smoothing and breaking provides the optimum extension of the casing to achieve the most uniform diameter possible for the filled casing, and also provides some additional portion of the casing which is necessary for closing operation. Some of these preceding method and apparatuses do not provide a controllable degree of extension of the casing (U.S. Pat. No. 4,292,711). Some of these preceding devices provide a controllable degree of extension of the casing only outside of the working cycle during a maintenance (U.S. Pat. No. 3,872,543). The preceding apparatus which provides a controllable degree of extension of the casing during the working cycle have many driving parts (U.S. Pat. No. 4,442,568). This device operates without any connection with the extension of the filling casing. If the conditions of the filling are changed during the working cycle this device should be regulated manually.

SUMMARY OF THE INVENTION

Accordingly, it is an object of the present invention to provide a method and apparatus for intermittently dispensing of filled products which avoids the disadvantages of the prior art. More particularly, an object of the present invention is the provision of a method of and apparatus for intermittently dispensing of filled products which provides an automatic controllable degree of the extension of the filling tubular casing during the filling of the items and the closing of the ends to insure a more uniform diameter of the items without any damage of the casing.

Other objects and features will be in part apparent and in part pointed out hereinafter.

BRIEF DESCRIPTION OF THE DRAWINGS

FIG. I is a sectional side view of the apparatus taken along the line II—II of the FIG. 2 and its control diagram.

FIG. 2 is a sectional view of the apparatus of FIG. I taken along the line I—I of FIG. I.

FIG. 3 is a partial sectional view of the apparatus of FIG. I taken along the line I—I of FIG. 1 in the position of the absence of the air pressure inside of the swelling balloon.

FIGS. 5 through 8 are sectional side views of several versions of the apparatus.

DETAILED DESCRIPTION OF PREFERRED EMBODIMENT

Figure 4:
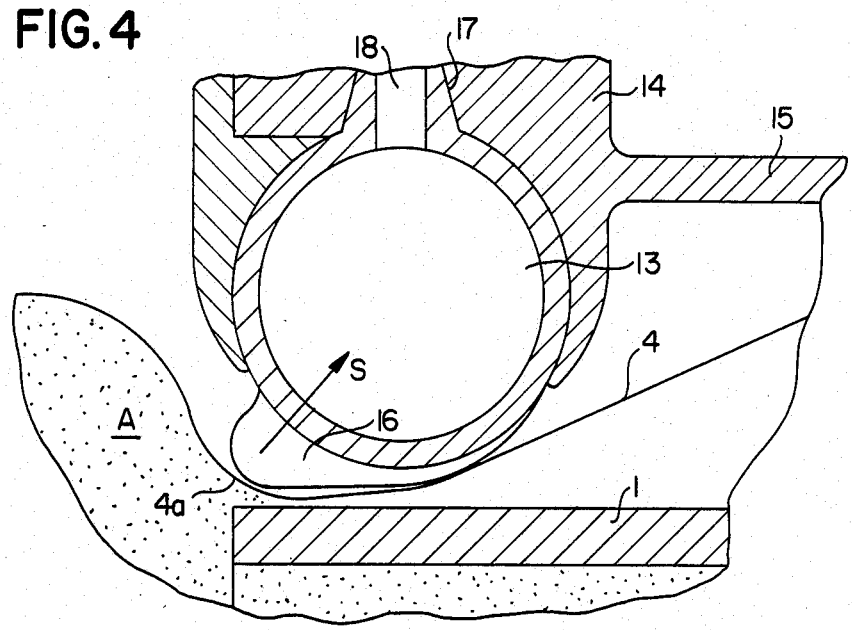
FIG. 4 is a partial sectional view of the flexible toroidal balloon.

Referring to the drawings, the apparatus comprises a stuffing member 1, having a free end 1a. A shirred tubular casing 2 is placed on the stuffing member 1. A stuffing material 3 flows under pressure through the stuffing member 1 into a deshirred portion of the casing 4.

The embodiment of the apparatus shown on FIG. 1 has a swelling annular balloon 5 made for example from partly corded rubber which has conic button 6 with opening 7 for feeding a fluid mass (for example the air) into and out of its inner space. A split ring 8, fitting 9 and canal 10 serve as a means for distributing the air into and out of the inner space of the balloon 5 via the opening 7. The swelling balloon 5 shown in an inflated position on FIGS. 1 and 2 and in the position of the absence of the air pressure in its inner space on FIG. 3. The balloon 5 has a spacing sleeve 11 which serves as a deshirred element and a wave-like external surface 12 (FIG. 2) which serves as a smoothing element.

In order to break a withdrawal of the casing and control an extension of the filling casing, a flexible torodial balloon 13 inside of a ring 14 which has a sleeve 15 is disposed on the stuffing member so that an internal surface of the sleeve 15 is in contact with the external surface of the casing over the swelling balloon 5 when the latter is in the inflated position. The flexible toroidal balloon has an annular tooth-comb 16 (FIG. 4) and conic button 17 with opening 18. A hose fitting 19 communicates an inner space of the balloon 13 with an input part of an amplifier transformer 20. The inner space of the balloon 13, flexible communicating lines 26, and the input part of the amplifier-transformer 20 form a germetic chamber with air pressure inside of it which is little more than atmospheric pressure. The ring 14 is fixed to a removable body 21 and a distance between the swelling balloon 5 and the flexible toroidal balloon 13 is adjustable. A design of the balloon 13 is arranged so that the annular tooth-comb 16 surrounds the deshirred portion of the casing and forces it to an external surface of the stuffing member 1. As it is shown on FIG. 1 the output portion of the amplifier-transformer 20 communicates with a control part of a pressure regulator 22, an output part of which is communicated with the inner space of the swelling balloon 5 via switchable valves 23 and 24, fitting 9 canal 10 and opening 7. There is parallel connected pressure regulator 25. A known supporting device is referred schematically by number 28.

In the beginning of the operation the shirred tubular casing with a closed end is placed on the stuffing member 1 over the swelling balloon 15 which is in the position shown on FIG. 3. The movable body 21 with all units is placed in the position shown on FIG. 1. The valve 24 is switched to the position shown on FIG. 1 and degrees of air pressure are reached predetermined volume in the system after pressure regulators 22 and 25. The stuffing material 3 is pushed through the stuffing member 1 to the deshirred portion 4 of the casing. As a result of the frictional forces arising from the mutual contact of the internal surface of the sleeve 15 and the external surface of the casing, also from the mutual contact of the internal surface of the casing and the external surface of the balloon 5 the withdrawal of the tubular casing is braked and the casing is extended. The diameter of the filling part A of the item is increased. The annular tooth-comb 16 prevents backflow of the fluid mass in the direction opposite to the direction of the movement of the stuffing material and the casing 4a of the filling part A of the item brings the pressure to the flexible tooth-comb 16 and by that, to the balloon 13 in the direction as shown by arrow "S" on FIG. 4. The signal of the increase pressure in the balloon 13 is transformed and intensified by the amplifier-transformer 20 and controls the regulator 22 so that the pressure of air in the balloon 5 is reduced. In consequence of that the friction forces, the extension of the deshirred part of the casing and a degree of the pressure of the stuffing material in the filling part of the sausage are reduced until the predetermined balance of these data are established. The optimum degree of air pressure in the balloon 5 for the present casing, filling and diameter of the item are defined during the adjustment of the system and this data is established on the regulator 22. It is necessary to change the extension of the casing during the closing operation. When the extrusion of the filling is stopped the valve 23 is switched (by the control system of the sausage machine which is not shown) and the degree of air pressure for the closing operation is appeared in the balloon 5. The degree of air pressure for the closing operation has been established on the regulator 25 during the adjustment of the system.

For the replacement of the shirred casing, the air from the balloon 5 is released by the valve 24, the body 21 with units move from the stuffing member I and the new "stick" is put on the latter.

If it is necessary the balloon 5 can be made easily removable in order to use the shirred tubular casing with an internal diameter approximately equal to the external diameter of the stuffing member 1.

In order to reduce deleterious fluctuation of the signal an averager of the signal 27 is placed in the line between the amplifier 20 and the flexible balloon 13.

Figure 5:
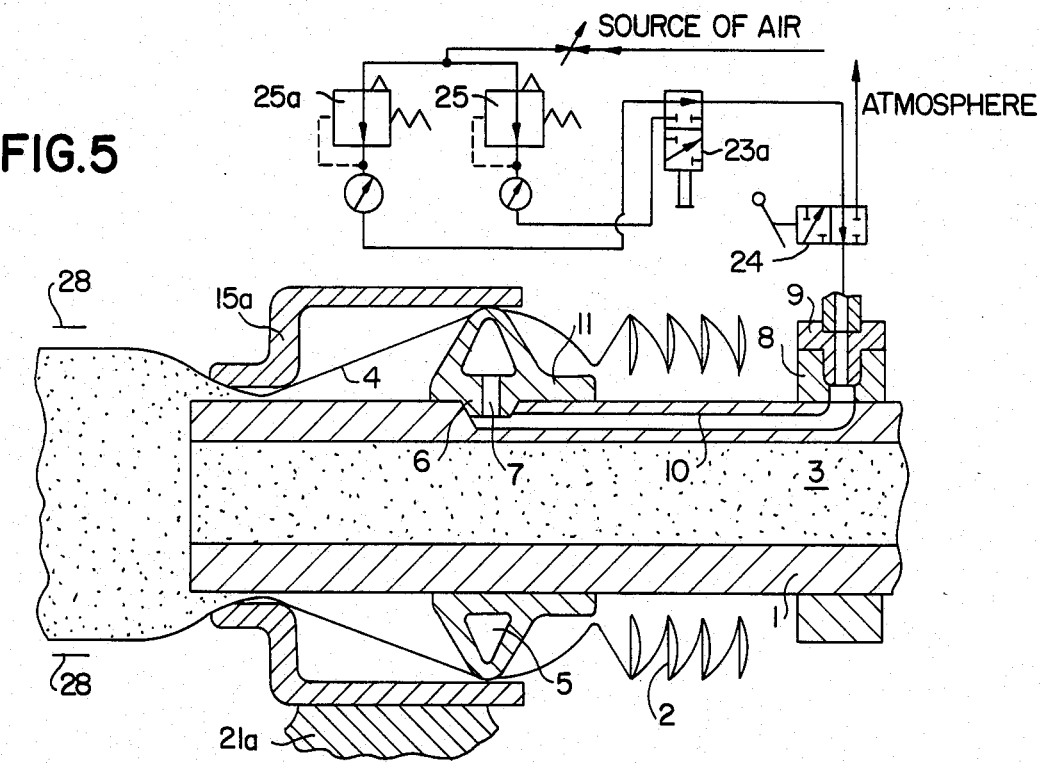

If technical characteristics of the shirred casing and the stuffing material remain constant during the working cycle it is possible to use the apparatus which is shown on FIG. 5. In this case it provides the constant extension of the deshirred portion of the casing. The balloon 5 and the sleeve 15a provide deshirring, smoothing and braking of the shirred casing as it is in the apparatus shown on FIG. 1. The downstream part of the sleeve 15a prevents backflow of the stuffing material. The pressure controller 23a provides a constant degree of pressure in the balloon 5, by that, is provided constant frictional forces and, as a consequence, the constant extension of the casing. In order to replace the shirred casing a removable body 21a with all units is moved from the stuffing member and a new "stick" is put on the latter.

Figure 6:
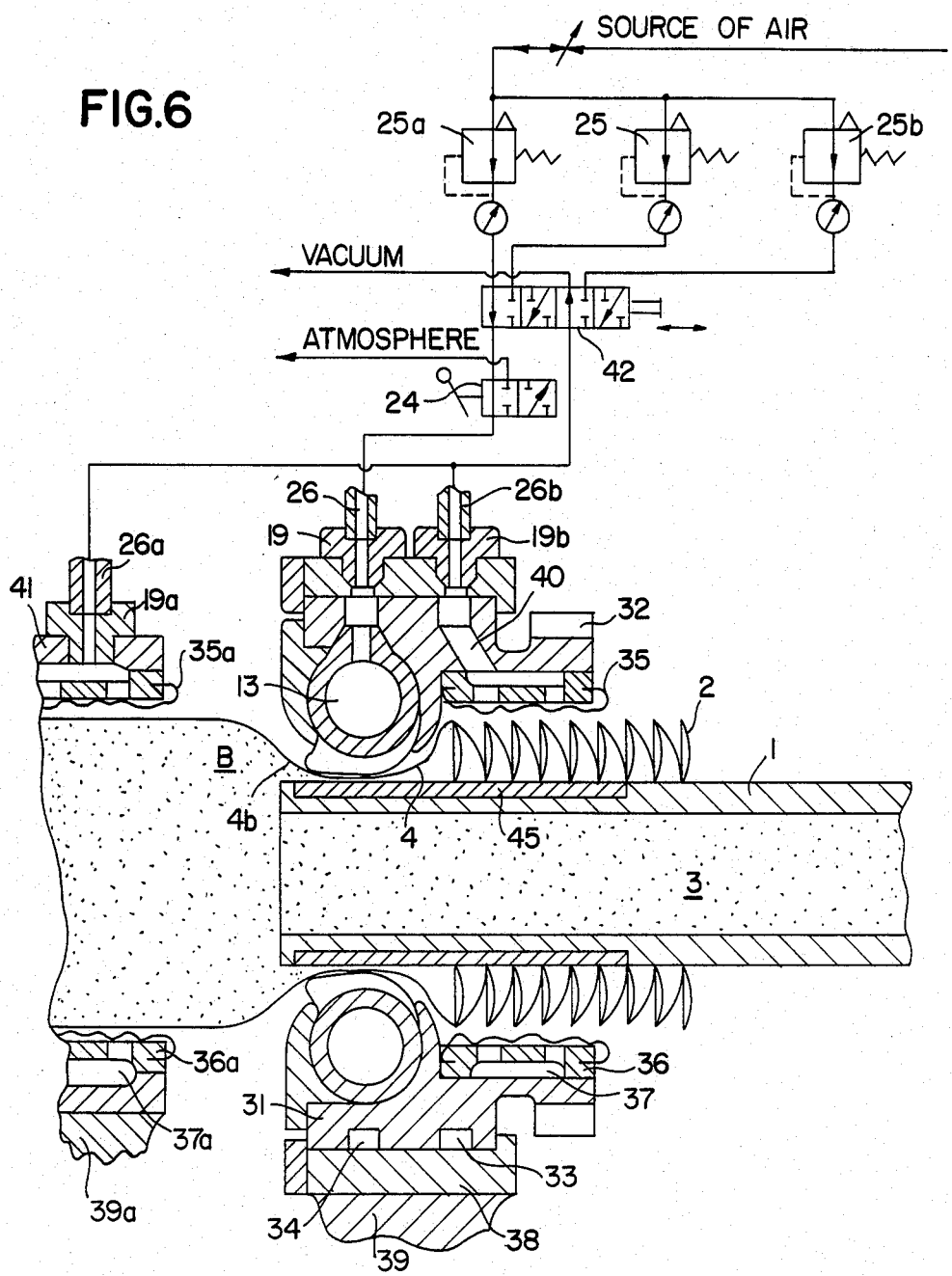

Another version of the apparatus which is intended to use approximately a medium artificial shirred tubular casing with an internal diameter a little more than the external diameter of the stuffing member 1 shown on FIG. 6. In this case items are separated by twisting the casing at the free end of the stuffing member 1. It comprises the stuffing member 1 through which a stuffing material 3 flows under pressure into the deshirred portion 4 of the tubular casing 2. The stuffing member has a rotative sleeve 45. The flexible toroidal balloon 13 of a shape as it is shown on FIG. 4 has the conical button 17 with the opening 18 and the annular toothcomb 16. It is placed in a ring 31 which has a driving member 32 (for examble a gear) and annular grooves 33 and 34. A stretching tube 35 (for example a plastic tube) both ends of which are tightly fixed to ends of a perforated tube 36 is placed into an upstream part of the ring 31 so that the upstream part of the ring 31, the perforated tube 36 and the stretching tube 35 form a chamber 37. The ring 31 is placed into a bearing 38 which is secured to a removable body 39, has fittings 19 and 19b. A known supporting device is located downstream of the free end 1a of the stuffing member 1. It can be arranged, for example, as a supporting means which has been described in the application Ser. No. 06.718.991, filling date 4/01/85. In this case the supporting device comprises a housing 41, a stretching tube 35a, both ends of which are tightly fixed to the end of a perforated tube 36a. The housing 41, the stretching tube 35a and the perforated tube 36a form a chamber 37a. The housing 41 has a fitting 19a and is secured to a removable body 39a.

As it is shown on FIG. 6 pressure regulators 25, 25a and 25b communicate source of air, vacuum and atmosphere with the inner space of the balloon 13, chambers 37 and 37a via switchable valve 24 and 42, fittings 26, 26a and 26b, groves 33 and 34, canal 40 and opening 18 accordingly.

If the extension of the casing is increased for any reason during the filling of the item, 4b of a filling part B of the item brings the pressure to the tooth-comb 16 and by that to the balloon 13 in the direction shown by the arrow S on FIG. 4. An annular clearance between internal surface of the tooth-comb 16 and external surface of the sleeve 45 is increased and as a result frictional force and the extension of the casing is reduced. A predetermined balance of data is established because the pressure regulator 25a provides a constant degree of air pressure in the balloon 13.

When one item has been filled the valve 42 is switched to the left position by means of a stuffing machine which is not shown, as a result:

a predetermined degree of air pressure which is necessary for supplying an additional portion of the casing during a twisting operation is established in the balloon 13 by the pressure regulator 25; The air is entered into the chamber 37, the stretching tube 35 is stretched, firmly embraces the shirred part of the casing and forces it to the rotative sleeve 45; the air is entered into the chamber 37a, stretching tube 35a is stretched, firmly embraces the filled item and prevents it rotating. Simultaneously the gear 32 is driven in rotation by a not shown means of a stuffing machine and thereby the casing is twisted at the free end of the stuffing member as it is shown on FIG. 8.

The rotation of the units is stopped when a predetermined quantity of the revolution has been made. The valve 42 is switched to the position shown on FIG. 6. Chambers 37 and 37a are vacumed, stretching tubes are released the shirred casing and the filled item and a working cycle is repeated.

In order to replace a new portion of the shirred casing the valve 24 is switched to the left position, bodys 39 and 39a with all units are removed and the shirred casing is placed on the stuffing member 1.

Figure 7:
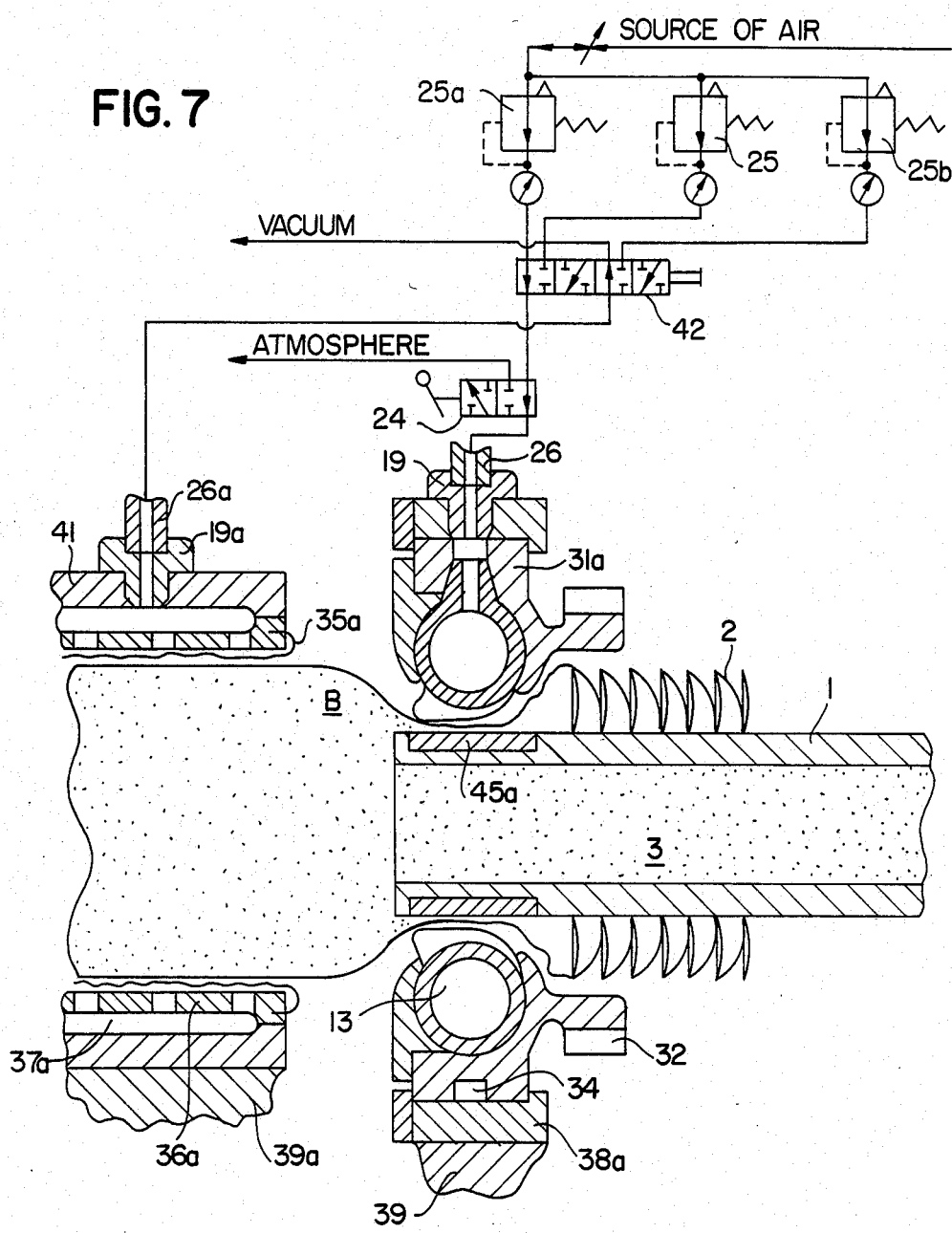

If the frictional force which corresponds to the predetermined degree of air pressure established by pressure regulator 25 in the balloon 13 to supply an additional portion of the casing for twisting operation is quite enough to rotate the shirred portion of the casing, the apparatus with the ring 31a which is shown on FIG. 7 can be used. The arrangement and the operation is clear from preceeding descriptions.

Another version of the apparatus which is intended for use with different kinds of casing, for example, a natural gut casing 2a shown on FIG. 8. This apparatus has the ring 31b secured to the removable body 39, a rotative stuffing member 1c which can rotate with a shirred casing to twist the casing between the free end of the stuffing member and supporting device as it is shown on FIG. 8. The stuffing member is driven by means of a stuffing machine which is not shown.

It is possible to use similar versions of the apparatus with a rotative stuffing member. In this case in the apparatus as shown on FIGS. 6 and 7 the driving means 32 and the rotative sleeve 45 and 45a are absent. The stuffing member rotates the casing and unites during the twisting operation. In these cases the stuffing member is driven by means of a stuffing machine which is not shown. The arrangement and the operation of these apparatuses is clear from preceeding descriptions. The invention is not limited to the details shown since various modifications and structural changes are possible without departing from the spirit of the present invention.

What is desired is to be protected by Letters Patent as set forth in particular in the appended claims.

What is claimed is:

1. The apparatus for intermittently dispensing of filled products comprising: a stuffing device which includes a stuffing member for stuffing a tubular casing with a mass of a stuffing material, means for supplying a deshirred portion of the casing to the free end of said stuffing member which includes swelling annular balloon with inner space disposed on said stuffing member and concentric sleeve disposed around said swelling balloon so that the deshirred portion of the casing is located between said swelling balloon and said sleeve, means for continuous automatic control of extension of the casing of the filling part of the item during filling of the item with a mass of stuffing material and for automatic control of extension of the deshirred part of the casing during closing operation, wherein said means for control of extension of the casing comprises source of air pressure, first adjustable means for permanently providing a first predetermined degree of air pressure into said swelling balloon during filling of the item, second adjustable means for providing a second predetermined degree of air pressure into said swelling balloon during closing operation to supply an additional portion of the casing to close the item, and switchable valve means for communicating the output parts of said adjustable means with said inner space of said swelling balloon, said concentric sleeve is secured to a movable body and its downstream part serves as a means for preventing backflow of the stuffing material.

2. The apparatus for intermittently dispensing of filled products comprising: a stuffing device which includes a stuffing member for stuffing a tubular casing with a mass of stuffing material, means for supplying a deshirred portion of the casing to the free end of said stuffing member, including a toroidal balloon, with an inner space, which serves as a braking element and has a feeding means, means for continuous automatic control of extension of the casing of the filling part of the item during filling of the item with a mass of stuffing material and for automatic control of extension of the deshirred part of the casing during closing operation, wherein said means for automatic control of extension includes source of air pressure, first adjustable means for permanently providing a first predetermined degree of air pressure into said inner space of said toroidal balloon during filling of the item, second adjustable means for providing a second predetermined degree of air pressure into said toroidal balloon during closing operation, and switchable valve means for communicating the output parts of said adjustable means with said inner space of said toroidal balloon via said feeding means of said balloon.

3. The apparatus of claim 2, wherein said toroidal balloon is fixedly disposed in a housing which has distributing means for feeding the air into and out of said inner space of said balloon, said housing is secured to a movable body and serves as a deshirring element.

4. The apparatus of claim 2, wherein said stuffing member has an external antifriction means, said toroidal balloon is fixedly disposed in a housing which serves as a deshirring element, said housing is disposed with a turning ability in a bearing secured to a movable body, has a driving member and a holding means for holding the shirred tubular casing and rotating it with said housing to twist the deshirred part of the casing at the free end of said stuffing member during closing operation, said holding means has a stretching part with an inner chamber organized so that when the air is entered into said inner chamber, said stretching part is stretched and firmly holds the shirred casing, when the air is withdrawn from said inner chamber, said stretching part releases the shirred casing, said housing has distributing means for feeding the air into and out of said inner space of said balloon and said inner chamber of said stretching part, said bearing has means for communicating said distributing means with said sources of air, vacuum and said switchable valve means.

5. The apparatus for intermittently dispensing of filled products comprising: a stuffing device which includes a stuffing member for stuffing a tubular casing with a mass of a stuffing material, means for supplying a deshirred portion of the casing to the free end of said stuffing member which includes a swelling annular balloon with an inner space disposed on said stuffing member and a concentric sleeve disposed around said swelling balloon so that the deshirred portion of the casing is located between said swelling balloon and said sleeve, means for continuous automatic control of extension of the casing of the filling part of the item during filling of the item with a mass of stuffing material and for automatic control of extension of the deshirred part of the casing during closing operation, wherein said means for control of extension of the casing comprises sensing means for continuously sensing the extension of the casing of the filling part of the item which includes a flexible toroidal balloon with an inner space, an amplifier-transformer and communicating line, said toroidal balloon has a perceptive means for a perception of a modification of a shape of the filling part of the item.

6. The apparatus of claim 5, wherein said inner space of said toroidal balloon, an input part of said amplifier-transformer and said communicating line form a hermetic chamber wherein a degree of air pressure is from 5% to 50% more than atmospheric pressure.

7. The apparatus of claim 5, wherein said perceptive means is a flexible annular tooth-comb.

8. The apparatus of claim 15, wherein said toroidal balloon is disposed on said stuffing member an adjustable distance from its free end so that said perceptive means of said toroidal balloon is contacted with an external surface of the filling part of the item and arranged as means for preventing back flow of stuffing material.

9. The apparatus of claim 5, wherein said toroidal balloon, said sleeve said communicating line are united by a ring secured to a movable body.

10. The apparatus of claim 5, wherein means for continuous automatic control of extension of the casing of the filling part of the item includes an operating system for varying degree of air pressure into said swelling balloon during filling of the item and providing a predetermined degree of air pressure into said swelling balloon during closing operation, which comprises the source of air pressure, main regulating means for varying degree of air pressure into said swelling balloon during filling of the item, adjustable means for providing the predetermined degree of the air pressure into said swelling balloon during closing operation to supply an additional portion of the casing to close the item and switchable valve means which communicate the output parts of said main regulating means and said adjustable means with said inner space of said swelling balloon and wherein an input part of said main regulating means is constantly communicated with an output part of said amplifier-transformer.

11. In a method for intermittently dispensing of filled products including the steps of supplying a deshirred portion of a tubular casing to a free end of a stuffing member from which the casing is stuffed with a mass of stuffing material, providing of frictional forces which brake the withdrawal of the deshirred portion of the tubular casing during stuffing of the item by squeezing said casing between two approximately concentric surfaces wherein at least one of them belongs to a swelling member, which has an inner space, the improvement comprising the following steps: continuously sensing the extension of the casing of the filling part of the item by sensitive means in permanent contact therewith, which produce continuous signal whose intensity corresponds to the intensity of extension of the casing of the filling part of the item, said sensitive means also preventing backflow of the stuffing mass in the direction opposite to the direction of flow of the stuffing material through the stuffing member, varying a degree of the air pressure into said inner space of said swelling member in accordance with said intensity of said continuous signal to control extension of the casing of the filling part of the item.

* * * * *